Oct. 19, 1954   J. E. HURST   2,692,039
STRAW DISCHARGE CONVEYER FOR COMBINE HARVESTERS
Filed May 9, 1951   3 Sheets-Sheet 1
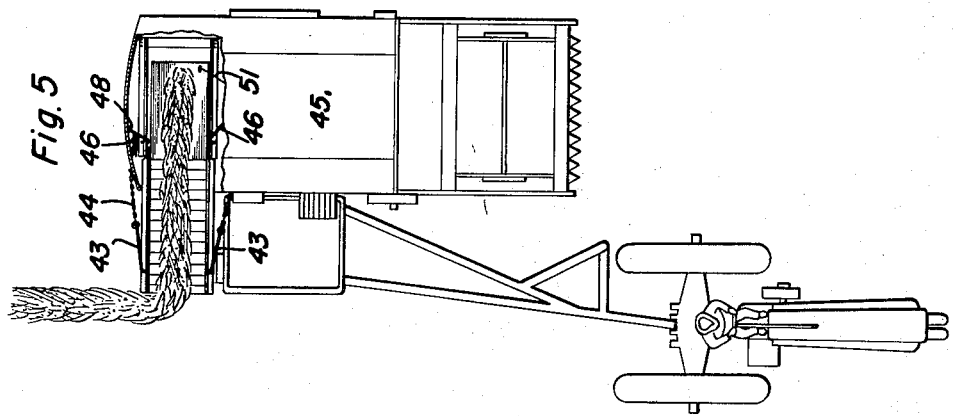
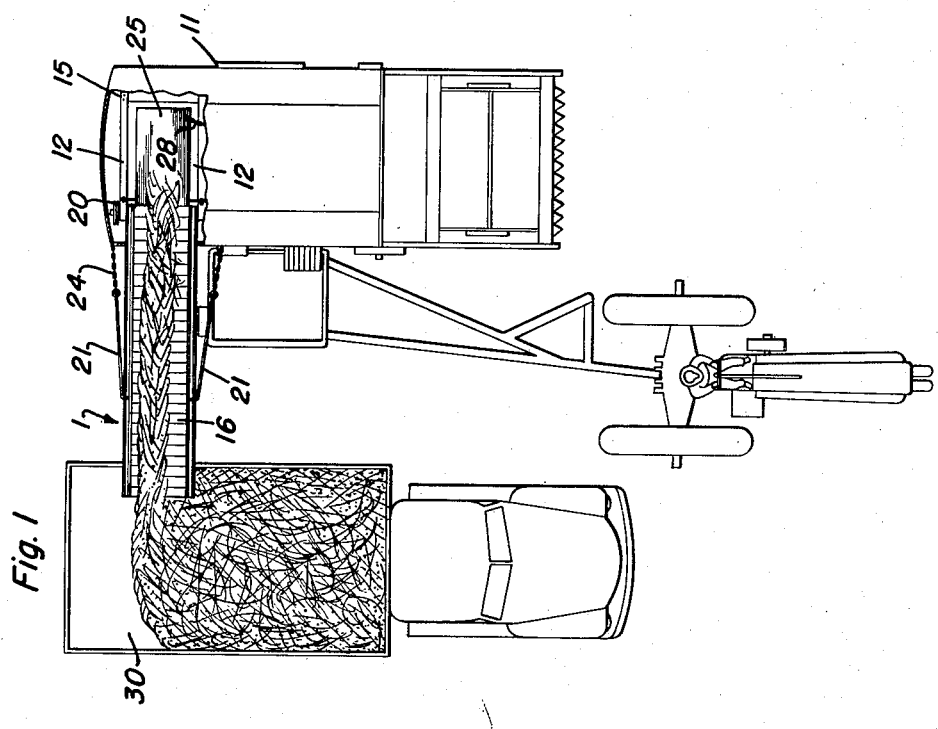
James E. Hurst
INVENTOR.

Oct. 19, 1954   J. E. HURST   2,692,039
STRAW DISCHARGE CONVEYER FOR COMBINE HARVESTERS
Filed May 9, 1951   3 Sheets-Sheet 2
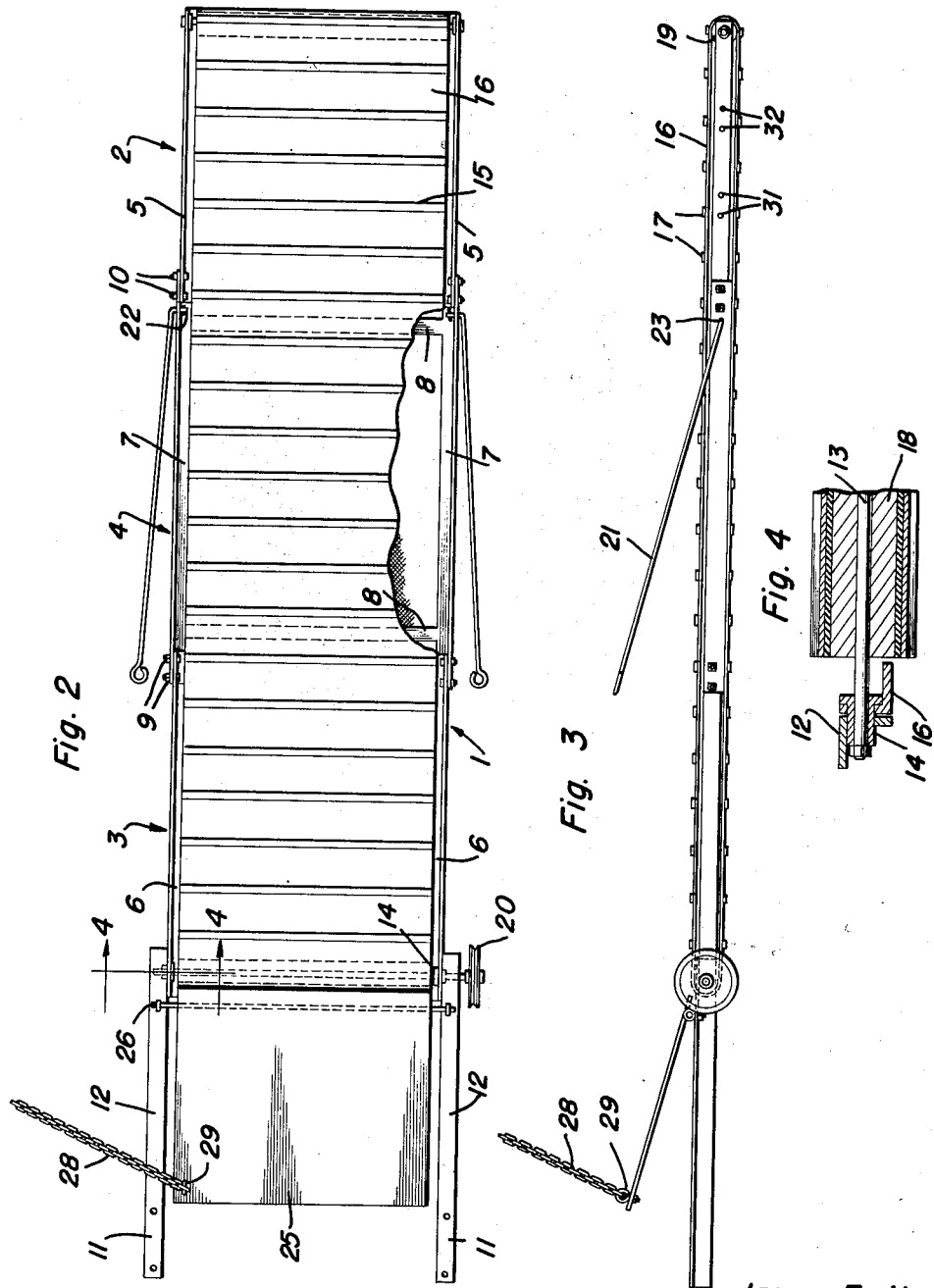
James E. Hurst
INVENTOR.

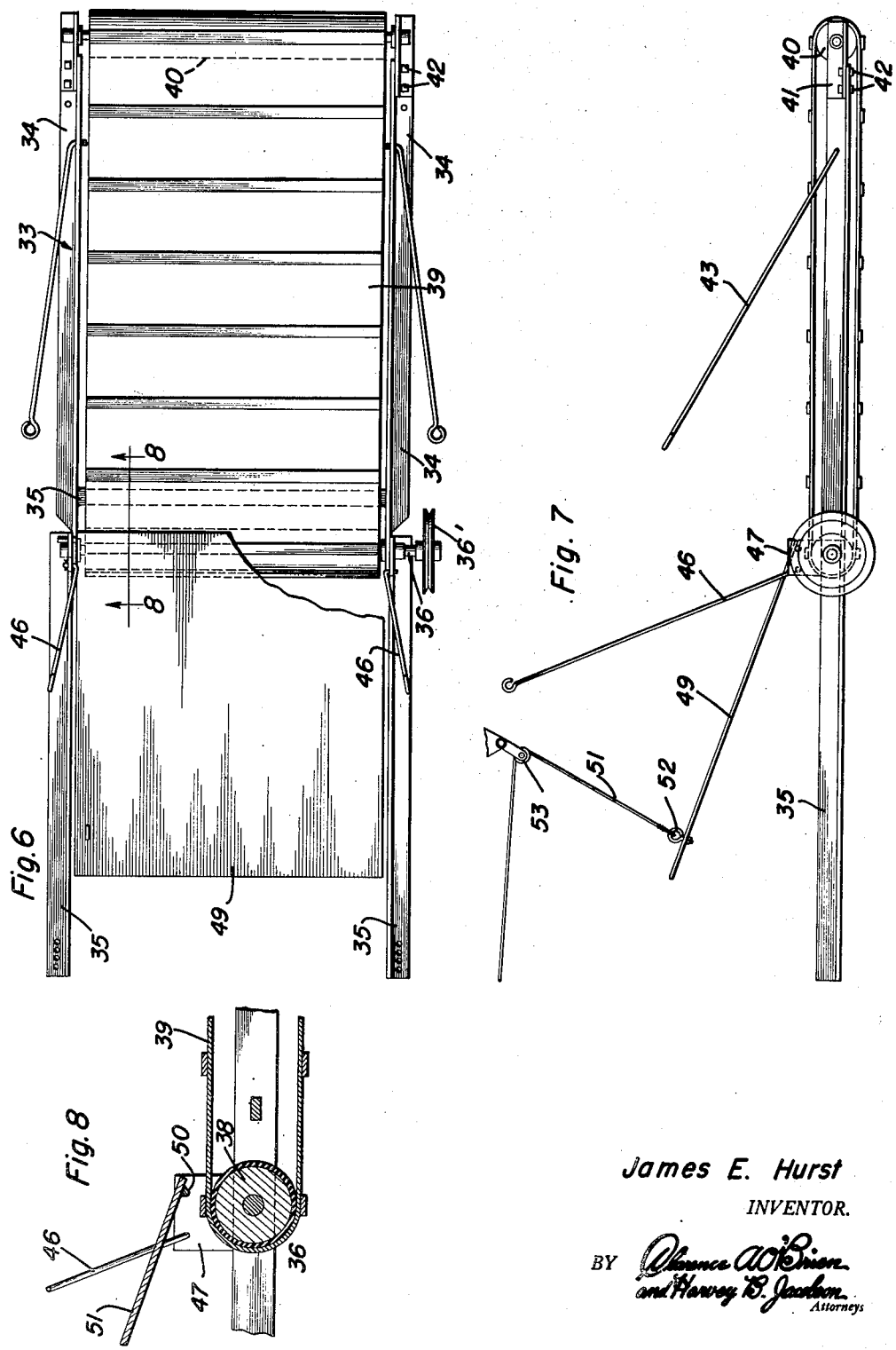

Patented Oct. 19, 1954

2,692,039

UNITED STATES PATENT OFFICE 2,692,039

STRAW DISCHARGE CONVEYER FOR COMBINE HARVESTERS

James E. Hurst, Twelve Mile, Ind.

Application May 9, 1951, Serial No. 225,387

3 Claims. (Cl. 198—52)

My invention relates to improvements in straw discharge conveyors for unloading the straw from combine harvesters while traveling in the field.

The primary object of the invention is to provide a simply constructed conveyor for attachment to the harvester below the conventional straw walker bars therein to catch and discharge the straw into either windrows in the field, or, into a truck at one side of the harvester.

Another object is to provide a conveyor for the purpose specified which is adapted to discharge in windrows close to the harvester, or, into a wagon at the side of the harvester remote therefrom.

Still another object is to provide a conveyor for accomplishing the above with attaching means for mounting the same to the conventional combine harvester without any alteration in the harvester and which is comparatively inexpensive to manufacture, service and install.

Other and subordinate objects, within the purview of my invention, together with the precise nature of my improvements will be readily understood when the succeeding description and claims are read in reference to the drawings accompanying and forming part of this specification.

In said drawings:

Figure 1 is a view in plan, partly broken away and shown in section, illustrating my improved conveyor in the preferred embodiment thereof mounted to a combine harvester and for discharging the straw in a wagon;

Figure 2 is a view in plan of the conveyor detached and drawn to a large scale;

Figure 3 is a view in side elevation of the same;

Figure 4 is a fragmentary view in transverse section taken on the line 4—4 of Figure 2 and drawn to a larger scale;

Figure 5 is a view in plan illustrating a modified embodiment of the invention attached to the conventional harvester for discharging close to the side of the harvester in windrows;

Figure 6 is a view in plan of the modified embodiment detached and drawn to a larger scale;

Figure 7 is a view in side elevation of the same; and

Figure 8 is a fragmentary view in horizontal section taken on the line 8—8 of Figure 6 and drawn to a large scale.

Referring to the drawings by numerals, and first to Figures 1 to 4, in the preferred embodiment thereof my improved conveyor comprises a conveyor frame, designated 1, as a unit, including front, rear and intermediate frame sections 2, 3, 4, respectively. The front section 2 includes a pair of angle iron side bars 5, the rear section 3 a similar pair of side bars 6, and the intermediate section a pair of angle iron side bars 7, cross-connected adjacent the ends thereof by transverse bars 8. Bolts 9, 10 at the ends of the side bars 7 detachably connect the intermediate section 4 to the confronting ends of the side bars 5 and 6.

Means are provided for attaching the conveyor frame 1 to a combine harvester 11 for extension from one side thereof and for vertical swinging adjustment comprising a pair of parallel mounting bars 12 extending rearwardly of the rear section 3 with the rear ends of the side bars 6 of the section 3 pivoted between corresponding ends of said bars 12 by a transverse guide shaft 13 for a conveyor belt, presently described, said shaft 13 being journaled at its ends in bearings 14 in said side bars 6, 12, as best shown in Figure 4. The mounting bars 12 are adapted to be secured, as by bolts 15, to any suitable part of the harvester 11, transversely thereof, below the conventional straw walker bars, not shown, of the harvester.

A conveyor belt 16 in the frame 1, with the usual cross flights 17 thereon, is trained around a drive roller 18 fast on the drive shaft 13, and around an idler roller 19 journaled between the front ends of the side bars 5 of the front section 2. A drive pulley 20 is provided on one end of the drive shaft 13 for connection in any suitable manner to the mechanism of the harvester 11 for drive thereby.

Conveyor supporting rods 21 at opposite sides of the frame 1 are provided with hooked front ends 22 insertable in apertures 23 in the side bars 7 and are suitably adjustably connected at the other ends thereof to the harvester 11 by chains 24 whereby said frame 1 is suspended in upwardly and forwardly inclined adjusted position at one side of the harvester 11.

A rectangular gravity-feed table 25 is provided at the rear end of the conveyor frame 1 above the mounting bars 12 for feeding straw onto the rear end of the conveyor belt 16, said table 25 being pivoted at its front edge for vertical swinging adjustment to vary the inclination thereof on a transverse rod 26 having its ends inserted in eye bolts 27 in said bars 12. A suspension chain 28 attached at one end, as at 29, to one corner at the opposite edge of the table 25 has its other end suitably connected to the harvester to hold said table 25 inclined outwardly and forwardly to the conveyor belt 16 to feed straw onto said belt.

As will now be seen, the straw is discharged from the harvester 11, from the straw walker bars, not shown, onto the feed table 25 to slide down said table onto the conveyor belt 16 and be conveyed by said belt away from one side of the harvester 11, for instance, to a wagon 30 driven alongside the harvester. A particular feature of the preferred embodiment of my invention is that when it is desired to discharge straw from the conveyor belt 16 close to the harvester 11 to form windrows, the intermediate frame section 4 may be detached and removed, the side bars 5 of the front section 2 bolted by means of the bolts 9 inserted through selected bolt holes 31 in the side bars 5 to the side bars 6 of the rear section 3, and the conveyor belt 16 suitably shortened. The hook ends 22 of the supporting rods 21 may then be inserted in selected apertures 32 in the side bars 5 of the front section 1.

The modified embodiment of my invention is especially designed for discharging the straw in windrows, without shortening the conveyor frame, and to that end comprises a short conveyor 33 including a single pair of side bars 34 cross-connected, as at 35, and, as in the preferred embodiment, pivoted for vertical swinging adjustment on a transverse conveyor driving shaft 36 journaled in the front ends of the mounting bars 35 and carrying a conveyor drive roller 38 fast thereon for driving the conveyor belt 39 trained around said roller and around an idler roller 40 journaled between the front ends of said bars 34, in this instance, in bearing plates 41 bolted, as at 42, to said side bars 34. As in the preferred embodiment, the drive shaft 36 is provided with a driving pulley 36′, and supporting rods 43 and chains 44 suspend the side bars 34 on the harvester 45 in upwardly and forwardly inclined position, preferably, at one side of the harvester. The mounting bars 35 are secured in the harvester 45 in the same manner as described with reference to the preferred embodiment except that the same are provided with suspension rods 46 pivoted at one end to upstanding plates 47 on the front ends of said bars 35 and having the other ends thereof suitably connected, as at 48, to the harvester 45.

A gravity feed table 49, like the table 25, is provided, in the modified embodiment, between the plates 47 to which the front edge of said table is pivoted, as at 50, for vertical swinging adjustment of said table to vary the pitch thereof. A table 51 for adjusting the table 49 is fixed at one end to a corner eye bolt 52 on said table and is trained upwardly over a suitably fixed pulley 53 in the harvester 45 for securing in any suitable manner, not shown, to the harvester to variably adjust said table 49 vertically.

The manner in which the modified embodiment of my invention operates will be clear from the foregoing description of the preferred embodiment and, therefore, requires no explanation.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described my invention, what is claimed as new is:

1. A straw discharge conveyor for attachment to a combine harvester to extend therefrom and discharge straw at a point remote from the harvester comprising a conveyor frame including side bars, an endless conveyor belt running between said side bars with an upper feeding run, a pair of parallel frame mounting bars fixed horizontally in said harvester transversely thereof, means pivotally mounting said frame between corresponding ends of said mounting bars for vertical swinging adjustment at one side of the harvester of said frame, means attached to said frame and harvester suspending said frame in adjusted position with said feeding run crosswise of the harvester, and a gravity feed table mounted on said mounting bars inside the harvester and between said bars and inclining downwardly to said upper run in the direction of feed of said run to feed straw thereto, and means to adjust said table.

2. A straw discharge conveyor according to claim 1 wherein said table is pivotally mounted on said bars for vertical adjustment into different inclined positions about an axis transverse to said upper run, and means to adjust said table.

3. A straw discharge conveyor according to claim 1 wherein said frame comprises sections one of which is detachable and the others of which are attachable to each other to shorten the frame, for use with a shortened conveyor belt to decrease the length of the conveyor.

References Cited in the file of this patent

UNITED STATES PATENTS

| Number | Name | Date |
|---|---|---|
| 213,935 | Reeder | Apr. 1, 1879 |
| 358,042 | Ketch | Feb. 22, 1887 |
| 530,267 | Hendricks et al. | Dec. 4, 1894 |
| 793,557 | Adams et al. | June 27, 1905 |
| 985,991 | Fiebach | Mar. 7, 1911 |
| 1,573,998 | Ribbans | Feb. 23, 1926 |
| 2,438,500 | Hertzler | Mar. 30, 1948 |